United States Patent
Itoh

(10) Patent No.: US 9,197,781 B2
(45) Date of Patent: Nov. 24, 2015

(54) COMMUNICATION APPARATUS CONFIGURED TO TRANSMIT TRANSMISSION DATA

(71) Applicant: BROTHER KOGYO KABUSHIKI KAISHA, Nagoya-shi, Aichi-ken (JP)

(72) Inventor: Shingo Itoh, Komaki (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/184,014

(22) Filed: Feb. 19, 2014

(65) Prior Publication Data
US 2014/0233074 A1     Aug. 21, 2014

(30) Foreign Application Priority Data
Feb. 21, 2013   (JP) .................................. 2013-032659

(51) Int. Cl.
  *H04N 1/21*   (2006.01)
  *H04N 1/32*   (2006.01)
  *H04N 1/44*   (2006.01)

(52) U.S. Cl.
  CPC ......... *H04N 1/2104* (2013.01); *H04N 1/32048* (2013.01); *H04N 1/32368* (2013.01); *H04N 1/4413* (2013.01); *H04N 1/444* (2013.01); *H04N 1/4433* (2013.01); *H04N 2201/0093* (2013.01)

(58) Field of Classification Search
  CPC ............ H04N 1/32368; H04N 1/2104; H04N 1/3208; H04N 1/32374; H04N 1/32496; H04N 2201/3235
  USPC .......................... 358/1.15, 1.13, 405; 382/305
  See application file for complete search history.

(56) References Cited

U.S. PATENT DOCUMENTS

2002/0027675 A1 *  3/2002  Minato ........................ 358/1.15
2008/0256630 A1 * 10/2008  Fujikawa ........................ 726/21

FOREIGN PATENT DOCUMENTS

JP          2002-305626 A     10/2002

* cited by examiner

*Primary Examiner* — Jamares Q Washington
(74) *Attorney, Agent, or Firm* — Merchant & Gould PC

(57) ABSTRACT

A processor performs acquiring counterpart information corresponding to destination of transmission data; acquiring a re-execution command for controlling a reader to repeatedly perform reading of an original document; acquiring a transmission command for transmitting the transmission data; in response to acquisition of the transmission command, controlling a communicator to transmit the transmission data in accordance with the counterpart information; in response to not to acquire the transmission command, storing the transmission data in a storage unit; and acquiring an addition execution command for performing reading of an original document of a data portion that is added to the stored transmission data. In response to acquisition of the transmission command after the addition execution command is acquired, the communicator is controlled to transmit new transmission data in accordance with the counterpart information. The new transmission data is acquired by adding the data portion to the stored transmission data.

9 Claims, 7 Drawing Sheets

FIG. 3

| JOB NO. | COUNTERPART INFORMATION | SETTING DATE AND TIME | POINTER | NUMBER OF PAGES | PASSWORD |
|---|---|---|---|---|---|
| 1 | 002-333-4444 | 10/29/2012 12:00 | ○○○○○ | 1 | 1234 |
| 2 | 006-777-8888 | 10/29/2012 19:00 | △△△△△ | 5 | 2345 |
| | | | | | |
| | | | | | |

FIG. 6

NEW TRANSMISSION?

1. YES

PLEASE INPUT PASSWORD
(4-DIGIT NUMBER)

NEXT PAGE EXISTS?

1. YES

| NO. | COUNTERPART INFORMATION | SETTING DATE AND TIME | NUMBER OF PAGES |
|---|---|---|---|
| 1 | 002-333-4444 | 10/29/2012 12:00 | 1 |
| 2 | 006-777-8888 | 10/29/2012 19:00 | 5 |
|   |   |   |   |
|   |   |   |   |

SPECIFY JOB?

FIG. 10

SELECT PROCESS?

1. ADD ORIGINAL DOCUMENT

2. TRANSMIT

3. CANCEL

COMMUNICATION APPARATUS CONFIGURED TO TRANSMIT TRANSMISSION DATA

CROSS REFERENCE TO RELATED APPLICATIONS

This application claims priority from Japanese Patent Application No. 2013-032659 filed Feb. 21, 2013. The entire content of the priority application is incorporated herein by reference.

TECHNICAL FIELD

The invention relates to a communication apparatus for transmitting transmission data corresponding to a read original document.

BACKGROUND

There is proposed technology relating to a communication apparatus for transmitting transmission data corresponding to a read original document. For example, in a facsimile apparatus, a user sets an original document on an original document table and pushes down a Select key, and then reading of the set original document is started. In the facsimile apparatus, subsequently, an LCD displays a message asking an existence of a further original document to be transmitted, so as to determine whether there is a further original document to be transmitted. Based on the user's operation of the Select key or an operation key for this display, if there is a further original document to be transmitted, the original document is set on the original document table again. If there is no further original document to be transmitted, transmission is started.

SUMMARY

For example, in a communication apparatus such as a facsimile apparatus, a user places an original document on an original document table one sheet at a time and, each time a sheet is placed on the original document table, reading of the original document is performed and transmission data for a plurality of pages is generated. In some communication apparatuses, when a predetermined period elapses after reading of the last sheet, transmission data generated for the sheets read until that time is transmitted automatically. When an original document to be transmitted includes a plurality of pages, the plurality of pages of the original document is placed on the original document table one sheet at a time, the original document is read, and transmission data including data portions for the plurality of pages is transmitted, the user may notice during that operation that there are not all pages of the original document. In the above-described communication apparatus, if the predetermined period elapses while the user is preparing a missing page of the original document, transmission data generated for the pages read until that time is transmitted automatically.

In view of the foregoing, the invention provides a communication apparatus. The communication apparatus includes a reader configured to read an original document placed on an original-document supporting member, a communicator configured to transmit transmission data, a processor, and a memory. The memory stores instructions, the instructions, when executed by the processor, causing the processor to perform: acquiring counterpart information corresponding to destination of the transmission data; acquiring a re-execution command for controlling the reader to repeatedly perform reading of an original document; acquiring a transmission command for transmitting the transmission data; in response to acquisition of the transmission command, controlling the communicator to transmit the transmission data in accordance with the counterpart information; in response to not to acquire the transmission command, storing the transmission data in a storage unit; and acquiring an addition execution command for performing reading of an original document of a data portion that is added to the transmission data stored in the storage unit. The instructions of controlling the communicator to transmit the transmission data include, in response to acquisition of the transmission command after the addition execution command is acquired, controlling the communicator to transmit new transmission data in accordance with the counterpart information, the new transmission data being acquired by adding the data portion to the transmission data stored in the storage unit.

According to another aspect, the invention also provides a non-transitory computer-readable storage medium storing computer-readable instructions. When executed by a processor, the computer-readable instructions cause the processor to perform: acquiring counterpart information corresponding to destination of transmission data; acquiring a re-execution command for repeatedly performing reading of an original document; acquiring a transmission command for transmitting the transmission data; in response to acquisition of the transmission command, transmitting the transmission data in accordance with the counterpart information; in response to not to acquire the transmission command, storing the transmission data in a storage unit; and acquiring an addition execution command for performing reading of an original document of a data portion that is added to the transmission data stored in the storage unit. The instructions of transmitting the transmission data include, in response to acquisition of the transmission command after the addition execution command is acquired, transmitting new transmission data in accordance with the counterpart information, the new transmission data being acquired by adding the data portion to the transmission data stored in the storage unit.

According to still another aspect, the invention also provides a method of transmitting transmission data acquired by reading an original document. The method includes: acquiring counterpart information corresponding to destination of transmission data; acquiring a re-execution command for repeatedly performing reading of an original document; acquiring a transmission command for transmitting the transmission data; in response to acquisition of the transmission command, transmitting the transmission data in accordance with the counterpart information; in response to not to acquire the transmission command, storing the transmission data in a storage unit; and acquiring an addition execution command for performing reading of an original document of a data portion that is added to the transmission data stored in the storage unit. In response to acquisition of the transmission command after the addition execution command is acquired, new transmission data is transmitted in accordance with the counterpart information, the new transmission data being acquired by adding the data portion to the transmission data stored in the storage unit.

BRIEF DESCRIPTION OF THE DRAWINGS

Embodiments in accordance with the invention will be described in detail with reference to the following figures wherein:

FIG. 3 shows an example of a hold job table;

FIG. 6 shows an example of a transmission-type selecting screen;

FIG. 7 shows an example of a password inputting screen;

FIG. 8 shows an example of a next-page inquiring screen;

FIG. 9 shows an example of a job specifying screen; and

FIG. 10 shows an example of a process selecting screen.

DETAILED DESCRIPTION

A communication apparatus according to an embodiment will be described while referring to FIGS. 1 through 10.

<Communication Apparatus>

Figure 1:
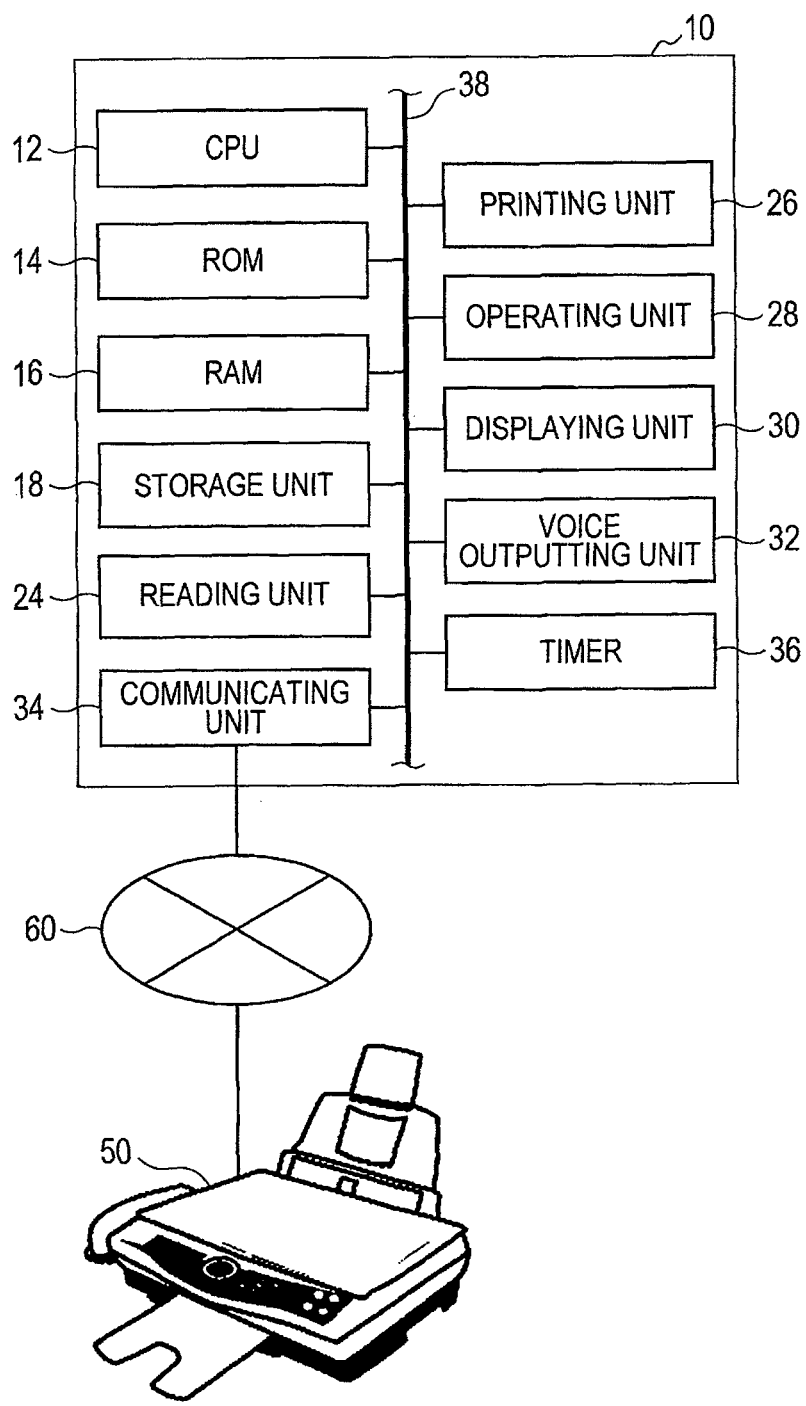
FIG. 1 is a block diagram showing an example of a communication apparatus.

A communication apparatus 10 is connected to a network 60, and performs transmission/reception of data corresponding to a read original document with a counterpart apparatus 50 (only one apparatus is shown in FIG. 1) connected to the network 60. For example, the communication apparatus 10 transmits, to the counterpart apparatus 50, transmission data corresponding to an original document read by the communication apparatus 10 itself. In this case, the communication apparatus 10 and the counterpart apparatus 50 are communication apparatuses having a facsimile function. The communication apparatus 10 has a scan function and a copy function, for example, in addition to the facsimile function. In the present embodiment, data corresponding to a read original document transmitted from the communication apparatus 10 is referred to as "transmission data", and it is assumed that the transmission data is transmitted with facsimile data standard from the communication apparatus 10 to the counterpart apparatus 50. The transmission data includes a data portion corresponding to a read original document. In a case where the read original document includes a plurality of pages, the transmission data includes data portions for respective ones of the plurality of pages. Examples of the network 60 include various public network such as a telephone network and an optical network.

Figure 2:
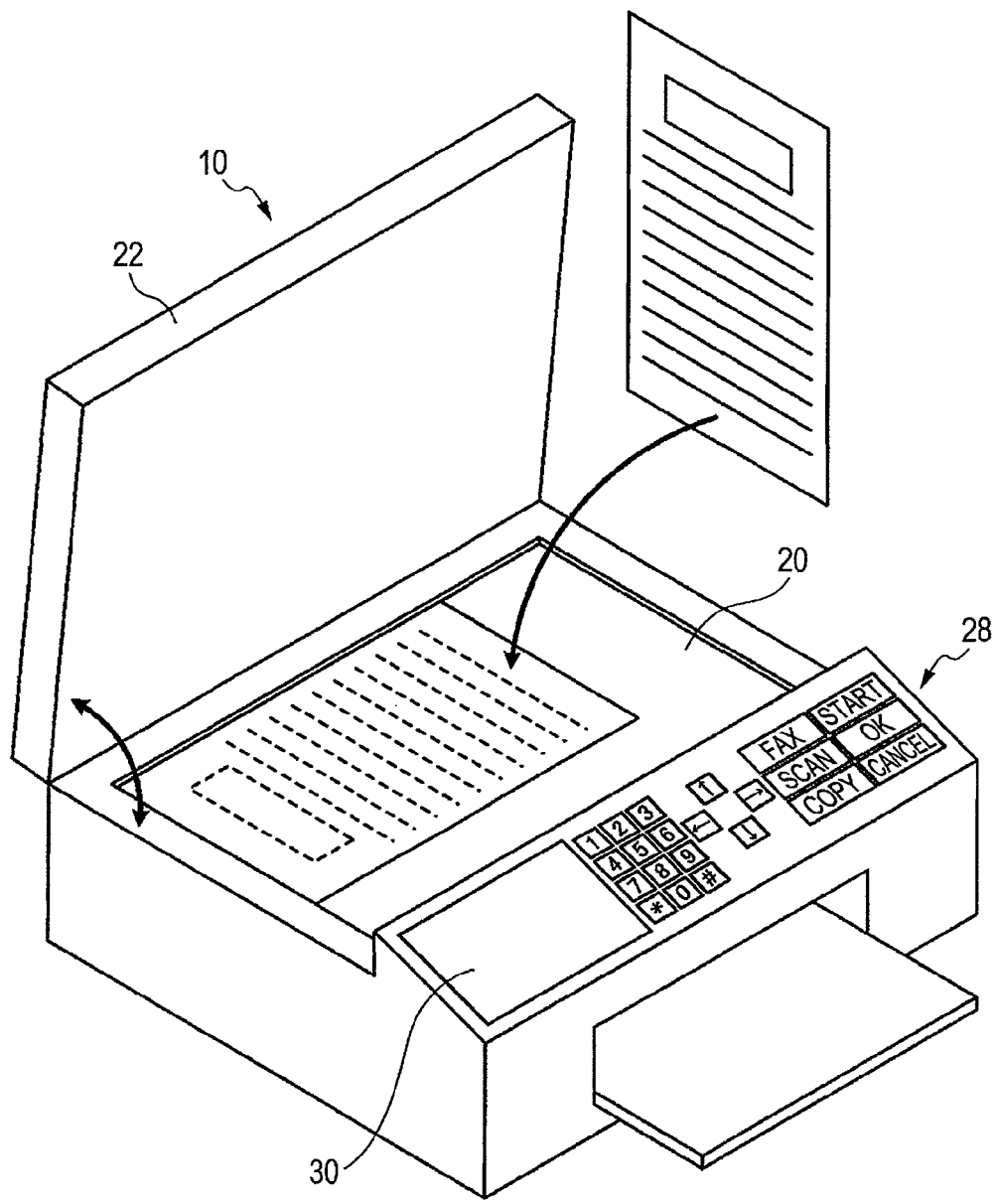
FIG. 2 is a perspective view showing an example of a state in which an original document is placed on an original document table of the communication apparatus.

As shown in FIGS. 1 and 2, the communication apparatus 10 includes a CPU 12, a ROM 14, a RAM 16, a storage unit 18, an original document table 20, an original-document-table cover 22, a reading unit 24, a printing unit 26, an operating unit 28, a displaying unit 30, a voice outputting unit 32, a communicating unit 34, and a timer 36. Out of these units of the communication apparatus 10, each unit other than the original document table 20 and the original-document-table cover 22 (see FIG. 2) is connected to a bus 38 (see FIG. 1). The CPU 12 executes an arithmetic process and controls the communication apparatus 10. The ROM 14 stores computer programs for various processes executed on the communication apparatus 10. The computer programs stored in the ROM 14 include, for example, a computer program for a transmission process described later (see FIGS. 4 and 5). The RAM 16 serves as a storage area that is used when the CPU 12 executes various computer programs. The RAM 16 stores predetermined data (information). For example, the RAM 16 stores a hold job table shown in FIG. 3.

The hold job table is a managing means for managing transmission data that is not transmitted in the transmission process. The hold job table stores a job number (job No.), counterpart information, setting date and time, a pointer, a number of pages, and a password in association with one another. The job number is a number for identifying a hold job stored in the hold job table. The counterpart information is address information of the counterpart apparatus 50, which is the destination of transmission data. In the present embodiment in which facsimile transmission is described as an example, the counterpart information is a FAX number of the counterpart apparatus 50. The setting date and time indicate date and time at which a hold job associated with each piece of information described above is stored in the hold job table in the transmission process. The pointer is storage-location information indicating a location where information indicative of each transmission data is stored, that is, more specifically, where transmission data managed by the hold job table is stored. The number of pages is information indicating how many pages of data are included in the transmission data. For example, in the transmission process, if reading of an original document is performed once and transmission data corresponding to the original document of one page is generated, the number of pages is "1" (see a record of "Job No.: 1" shown in FIG. 3). In the transmission process, if reading of an original document is performed five times and transmission data corresponding to the original document of five pages is generated, the number of pages is "5" (see a record of "Job No.: 2" shown in FIG. 3). The password is authentication information for transmission data that is managed by the hold job table.

The CPU 12 executes various computer programs stored in the ROM 14 and the like, to control the communication apparatus 10. With this operation, various processes are executed and various functions are realized in the communication apparatus 10.

The storage unit 18 is a nonvolatile memory such as a flash memory, for example. The storage unit 18 stores predetermined data. For example, in the transmission process, transmission data managed by the hold job table is stored in the storage unit 18. The hold job table may be stored in the storage unit 18, not in the RAM 16. Note that transmission data managed by the hold job table may be stored in the RAM 16. In this case, the RAM16 serves as a storage unit for the above-described transmission data. In the present embodiment, the hold job table is stored in the RAM 16, and the managed transmission data is stored in the storage unit 18.

The original document table 20 is a table on which an original document to be read is placed. The original document table 20 is formed with a transparent plate member, for example. The original-document-table cover 22 is a cover member that covers the original document table 20, and is provided at the communication apparatus 10 so that the original-document-table cover 22 can open and close. The original-document-table cover 22 is in an open state when an original document is placed on the original document table 20 as shown in FIG. 2, and is in a closed state when reading of the original document is performed. The reading unit 24 reads (scans) the original document placed on the original document table 20. The reading unit 24 includes an image sensor such as CCD or CIS. The reading unit 24 and the original document table 20 constitute a so-called flatbed scanner.

In order to perform facsimile transmission to the counterpart apparatus 50, the user of the communication apparatus 10 opens the original-document-table cover 22 and places an original document on the original document table 20 (see FIG. 2). If the original document to be transmitted has a plurality of pages (a plurality of sheets), each time reading is finished, the user manually exchanges the original document placed on the original document table 20 by opening and closing the original-document-table cover 22. This operating procedure is the same as that of a known communication apparatus having a facsimile function.

When transmission data transmitted from the counterpart apparatus 50 is received in the communication apparatus 10, for example, the printing unit 26 prints an image corresponding to the received transmission data on printing paper. The printing unit 26 is constituted by a printing device of the inkjet method or laser method, for example. As shown in FIG. 2, the operating unit 28 includes a plurality of keys such as a FAX key, ten keys, a start key, and a cancel key. In addition to the above-described keys, the operating unit 28 also includes a scan key, a copy key, cursor keys, and an enter key (OK key), for example (see FIG. 2).

The FAX key is pressed when facsimile transmission through the facsimile function is performed. The start key is pressed in order to start a transmission operation. The ten keys are pressed in order to input counterpart information, to perform a predetermined input in accordance with a predetermined screen displayed on the displaying unit 30, and the like. The cancel key is pressed in order to cancel a process that has been started, and the like. The user can input various commands and so on to the communication apparatus 10 by operating keys, of the operating unit 28, associated with various commands and so on.

The displaying unit 30 is a display for displaying various kinds of information. The voice outputting unit 32 is a speaker for outputting predetermined sounds including a notification sound. The communicating unit 34 is connected to the network 60, and performs communication via the network 60. For example, the communicating unit 34 transmits and receives transmission data. The communicating unit 34 includes a predetermined network interface depending on the type of the network 60, as in a known communication apparatus having a facsimile function. The timer 36 has a calendar function and keeps the current time.

The counterpart apparatus 50 is a known communication apparatus having a facsimile function. The counterpart apparatus 50 may be of the same model as the communication apparatus 10. Accordingly, descriptions for the counterpart apparatus 50 are omitted.

<Transmission Process>

The transmission process executed in the communication apparatus 10 will be described while referring to FIGS. 4 and 5. The transmission process is started, for example, when the user presses the FAX key of the operating unit 28. The CPU 12 having started the transmission process accesses the hold job table stored in the RAM 16, and determines whether a hold job is stored (S100). If no hold job is stored in the hold job table (S100: No), the CPU 12 moves the process to S104. If a hold job is stored in the hold job table (S100: Yes), the CPU 12 controls the displaying unit 30 to display a transmission-type selecting screen. With this control, the displaying unit 30 displays the transmission-type selecting screen shown in FIG. 6, for example. The transmission-type selecting screen is a selection screen for selecting whether the facsimile transmission this time is new transmission or is directed to transmission data managed by the hold job table.

After the transmission-type selecting screen is displayed on the displaying unit 30, the CPU 12 determines whether facsimile transmission this time is new transmission (S102). The user operates the ten keys of the operating unit 28 in accordance with displayed contents of the transmission-type selecting screen to input "1. YES" or "2. NO". Specifically, if the facsimile transmission this time is new transmission, the user presses the "1" key of the operating unit 28. In contrast, if the facsimile transmission this time is directed to transmission data managed by the hold job table, the user presses the "2" key of the operating unit 28. If the user presses the "1" key of the operating unit 28 (S102: Yes), the CPU 12 moves the process to S104. In S104, the CPU 12 acquires the counterpart information and the start command that are inputted based on the user's operation on the operating unit 28.

If S104 is executed after a negative determination is made in S100 (S100: No), the user presses the FAX key and subsequently presses the ten keys of the operating unit 28 to input the counterpart information. Further, after the user inputs the counterpart information, the user presses the start key of the operating unit 28 to input the start command. If S104 is executed after a positive determination is made in S102 (S102: Yes), the user presses the "1" key of the operating unit 28 and subsequently presses the ten keys of the operating unit 28 to input the counterpart information. Further, after the user inputs the counterpart information, the user presses the start key of the operating unit 28 to input the start command.

After the counterpart information and the start command are acquired, the CPU 12 controls the displaying unit 30 to display a password inputting screen. With this control, the displaying unit 30 displays the password inputting screen shown in FIG. 7 (in an initial state, the asterisk marks "****" in FIG. 7 are displayed). The password inputting screen is an input screen for requesting input of a character string that serves as a password for transmission data for a case where the facsimile transmission this time is put on hold (see S110: Time-out in FIG. 4). The password is a four-digit number, for example. The user operates the ten keys of the operating unit 28 in accordance with the display of the password inputting screen to input the four-digit number as the password. The CPU 12 controls the displaying unit 30 to sequentially display the asterisk marks "*", for example, as the numbers are inputted. The user can learn the number of digits to be inputted, based on the asterisk marks "*" displayed on the password inputting screen. The CPU 12 acquires the inputted password (S106).

Next, the CPU 12 controls the displaying unit 30 to display a message screen (not shown) including information that "Please place an original document on the original document table". With this control, the displaying unit 30 displays the message screen including the above-described information. The user opens the original-document-table cover 22, places an original document on the original document table 20, and closes the original-document-table cover 22. The CPU 12 controls the reading unit 24 to perform reading of the original document (for one page) placed on the original document table 20 (S108). The reading unit 24 performs reading of the original document placed on the original document table 20. With this operation, a data portion corresponding to the read original document is generated. The data portion serves as transmission data. At this timing, the transmission data is stored in the RAM 16.

After the reading unit 24 completes reading, the CPU 12 controls the displaying unit 30 to display a next-page inquiring screen. With this control, the displaying unit 30 displays the next-page inquiring screen shown in FIG. 8, for example. The next-page inquiring screen is an inquiry screen for inquiring whether reading of the original document is to be repeated. After the displaying unit 30 displays the next-page inquiring screen, the CPU 12 determines whether the next page exists (S110). The user operates the ten keys of the operating unit 28 in accordance with the display of the next-page inquiring screen, and inputs "1. YES" or "2. NO". Specifically, if the original document of the next page exists, the user opens the original-document-table cover 22, places the original document of the next page on the original document table 20, closes the original-document-table cover 22, and presses the "1" key of the operating unit 28. If reading of all the original document to be transmitted is finished and the original document of the next page does not exist, the user presses the "2" key of the operating unit 28.

If the user presses the "1" key of the operating unit 28 (S110: Yes) in accordance with the display of the next-page inquiring screen in a state where the original document of the next page exists, the CPU 12 returns the process to S108 and again controls the reading unit 24 to perform reading of the original document (for one page) placed on the original document table 20 (S108). The reading unit 24 performs reading of the original document placed on the original document table 20. With this operation, a data portion corresponding to the read original document is generated, and the data portion acquired from reading this time is added to the transmission data for the data portion that is already generated. The sequence of a plurality of data portions in transmission data is the sequence in which reading is performed. That is, the data portion acquired from reading this time is subsequent to the data portion acquired from the previous reading. After reading is completed again, the CPU 12 repeatedly executes S110 as described above.

If the user presses the "2" key of the operating unit 28 (S110: No) in accordance with the display of the next-page inquiring screen in a state where the original document of the next page does not exist, the CPU 12 controls the communicating unit 34 to transmit transmission data including all the data portion acquired from reading in executed S108 to the address specified by the counterpart information acquired in S104 (S112). The communicating unit 34 transmits the transmission data to the counterpart apparatus 50 corresponding to the counterpart information. After executing S112, the CPU 12 deletes the transmission data stored in the RAM 16 and ends the transmission process.

If the user neither presses the "1" key nor the "2" key of the operating unit 28 in response to the display of the next-page inquiring screen, and if a preset period (time-out period) elapses after the next-page inquiring screen is displayed (S110: Time-out), the CPU 12 controls to store the generated transmission data in the storage unit 18. And, the CPU 12 controls to store, in the hold job table, the counterpart information acquired in S104, the setting date and time, the pointer, the number of pages, and the password acquired in S106, in association with one another (S114). At this time, the CPU 12 controls to store, in the storage unit 18, the transmission data including all the data portion acquired by reading in S108 that is executed. The pointer is storage-location information of the transmission data that is stored here. Each piece of the above-described information stored in the hold job table in association with one another is managed as a hold job.

For example, it is assumed that the counterpart information acquired in S104 is "006-777-8888", the current date and time is "Oct. 29, 2012 19:00", the transmission data is stored at "△△△△△" in the storage unit 18, the original document for "5 pages" is read, the password acquired in S106 is "2345", and a hold job of "Job No.:1" (FIG. 3) is already stored in the hold job table. In this case, in S114, based on each piece of the above-described information, the CPU 12 controls to store each information shown in FIG. 3 as "Job No.:2". Each piece of the above-described information is managed as a hold job of "Job No.:2", together with the transmission data stored in the storage unit 18. After executing S114, the CPU 12 deletes the transmission data stored in the RAM 16 and ends the transmission process.

Figure 5:
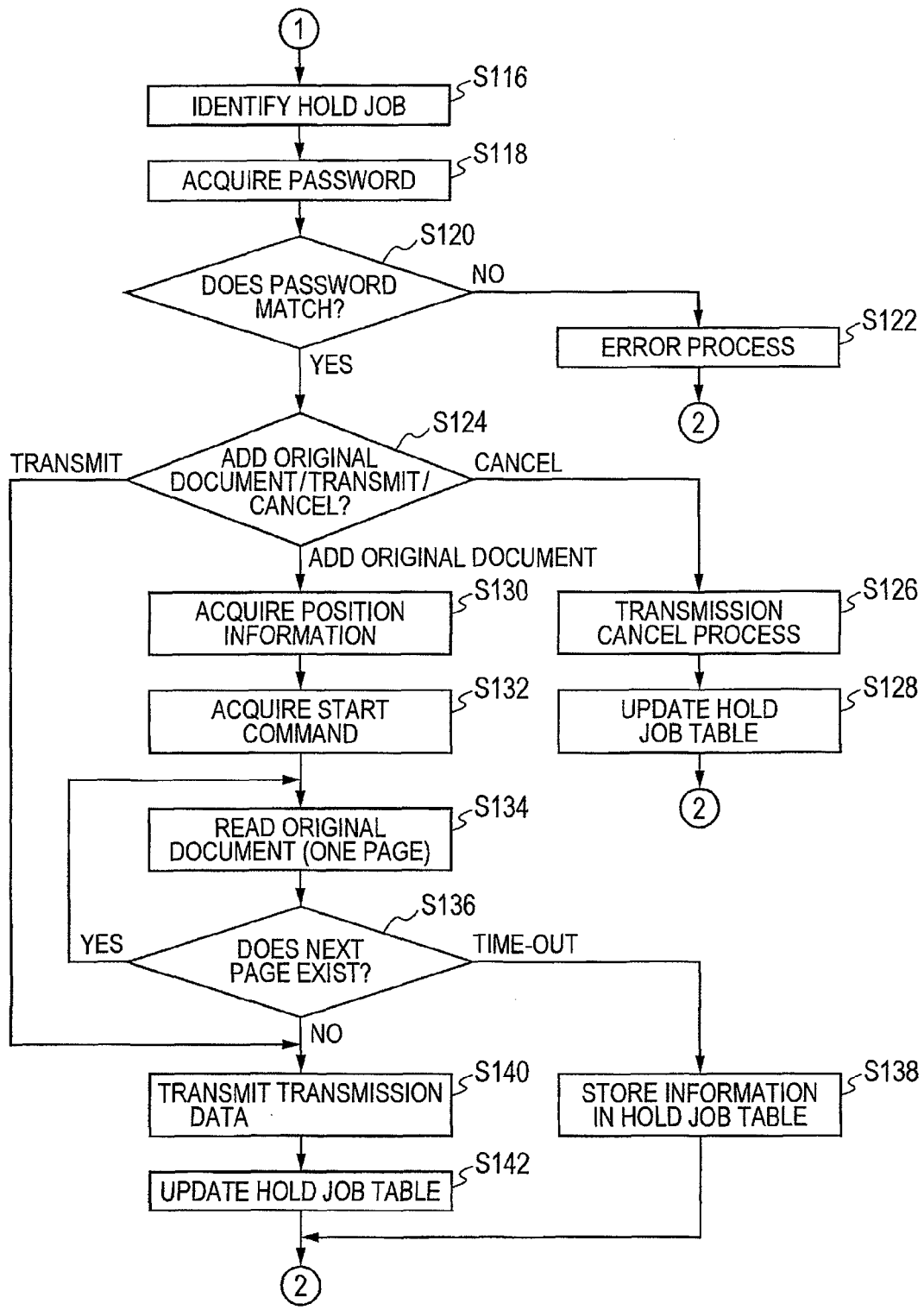
FIG. 5 is a flowchart showing a second part of the transmission process.

Returning to S102, if the user presses the "2" key of the operating unit 28 in accordance with the display of the transmission-type selecting screen (see FIG. 6) (S102:No), the CPU 12 moves the process to S116 (see FIG. 5). At the time of moving to S116, the CPU 12 controls the displaying unit 30 to display the job specifying screen. With this control, the displaying unit 30 displays the job specifying screen shown in FIG. 9, for example. The job specifying screen is a specifying screen for specifying one of the hold jobs stored in the hold job table. The job specifying screen is displayed in accordance with the hold job table. The hold jobs included in the job specifying screen correspond to the hold jobs stored in the hold job table. The "counterpart information", the "setting date and time", and the "number of pages" associated with each number ("No.") in the job specifying screen match the "counterpart information", the "setting date and time", and the "number of pages", in the hold job table, associated with "Job No." that is identical to the "No." of the job specifying screen.

In accordance with the display of the job specifying screen, the user operates the ten keys of the operating unit 28 to specify one desired hold job. For example, if the desired hold job is "No.2" in the job specifying screen, the user presses the "2" key of the operating unit 28. When the user presses the ten keys of the operating unit 28 in accordance with the display of the job specifying screen, the CPU 12 identifies the hold job of the number corresponding to the pressed key of the ten keys (S116).

After identifying the hold job, the CPU 12 controls the displaying unit 30 to display the password inputting screen (see FIG. 7, note that the asterisk marks "****" are not displayed in the initial state). With this control, the displaying unit 30 displays the password inputting screen. The user inputs the password for the hold job that is identified in S116 by pressing the ten keys of the operating unit 28. The inputting of the password and the accompanying process are the same as the above description, and the repetitive description is omitted. The CPU 12 acquires the inputted password (S118), and determines whether the acquired password matches the password that is associated with the hold job identified in S116 (S120). The CPU 12 accesses the hold job table and acquires the password that is associated with the hold job identified in S116.

If the acquired password does not match the password that is associated with the hold job identified in S116 (S120: No), the CPU 12 executes an error process (S122). Specifically, in S122, the CPU 12 controls the displaying unit 30 to display a message screen including information that "the password does not match" (not shown), and also controls the voice outputting unit 32 to output predetermined rejection sound. With this control, the displaying unit 30 displays the message screen including the above-described information, and the voice outputting unit 32 outputs the predetermined rejection sound. If a predetermined period elapses after S122 is executed, the CPU 12 ends the transmission process. If the user wishes to start the transmission process again, the user presses the FAX key of the operating unit 28. Note that, if the password does not match (S120: No), after displaying the message screen including information that "the password does not match", the password inputting screen may be displayed again to receive input of the password again. In this case, if the password does not match a predetermined number of times consecutively, the transmission process may end.

If the acquired password matches the password that is associated with the hold job identified in S116 (S120: Yes), the CPU 12 controls the displaying unit 30 to display a process selecting screen shown in FIG. 10, for example. With this control, the displaying unit 30 displays the process selecting screen shown in FIG. 10, for example. The process selecting screen is a selection screen for selecting a process for transmission data in the hold job identified in S116. An option "1. Add original document" is selected if the user wishes to perform reading another original document, to add a data portion corresponding to the newly-read original document to the transmission data in the hold job identified in S116, and to transmit the new transmission data (including added data) to the address specified by the counterpart information of this hold job. An option "2. Transmit" is selected if the user wishes to transmit the transmission data of the hold job identified in S116 as it is, to the address specified by the counterpart information of this hold job. An option "3. Cancel" is selected if the user wishes to delete the hold job identified in S116 from the hold job table. The user presses the "1" key of the operating unit 28 in order to select "1. Add original document", presses the "2" key of the operating unit 28 in order to select "2. Transmit", and presses the "3" key of the operating unit 28 in order to select "3. Cancel". The CPU 12 determines which of the options "1. Add original document", "2. Transmit", and "3. Cancel" is selected in accordance with the display of the process selecting screen (S124).

If the user presses the "2" key of the operating unit 28 in accordance with the display of the process selecting screen (S124: Transmit), the CPU 12 moves the process to S140. If the user presses the "3" key of the operating unit 28 (S124: Cancel), the CPU 12 executes a transmission cancel process (S126). In S126, the CPU 12 access the hold job table and acquires the pointer of the hold job identified in S116. The CPU 12 controls to delete the transmission data corresponding to the acquired pointer, from the storage unit 18. With this operation, this transmission data is deleted from the storage unit 18. Subsequently, the CPU 12 deletes the hold job identified in S116 from the hold job table to update the hold job table (S128).

If the hold job deleted in S128 is not the job number at the bottom in the hold job table ("Job No.:2" in FIG. 3), job numbers may be reassigned to the remaining hold jobs that have not been deleted. Alternatively, in a case where job numbers are not reassigned, a vacant job number may be assigned to the hold job that is newly stored in S114 in FIG. 4. After executing S128, the CPU 12 ends the transmission process.

If the user presses the "2" key of the operating unit 28 in accordance with the display of the process selecting screen (S124: Add original document), for example, the CPU 12 controls the displaying unit 30 to display a position specifying screen (not shown) including information that "Please specify a position to add (insert) an original document that is newly read". With this control, the displaying unit 30 displays the position specifying screen including the above-mentioned information. The user operates the ten keys of the operating unit 28 to input an adding position. For example, if the hold job identified in S116 is "Job No.:2" in the hold job table shown in FIG. 3, and if the user wishes to add (insert) a data portion corresponding to a new original document between the third page and the fourth page, the user presses the "4" key of the operating unit 28, for example. The CPU 12 acquires, as position information, the number inputted in accordance with the display of the position specifying screen (that is, acquires "Position information: 4" in the above-described example) (S130). If a key other than the keys of "1" to "9" and "0" in the operating unit 28 is pressed, or if no key is pressed within a predetermined period, it may be automatically determined that the adding position is the bottom of the hold jobs in the hold job table.

After the user presses the ten keys of the operating unit 28 in accordance with the display of the position specifying screen, or performs the above-described operation of automatically identifying the bottom of the hold jobs (including a case in which no key is pressed within the predetermined period), the user presses the start key of the operating unit 28 to input a start command. The CPU 12 acquires the start command that is inputted when the user presses the start key of the operating unit 28 (S132). After acquiring the start command, the CPU 12 controls the displaying unit 30 to display a message screen (not shown) including information that "Please place an original document on the original document table". With this control, the displaying unit 30 displays the message screen including the above-mentioned information. This is the same as the above-described processes shifting from S106 to S108 in FIG. 4, so the descriptions for this are omitted.

Next, the CPU 12 controls the reading unit 24 to perform reading of an original document (for one page) placed on the original document table 20 (S134). With this operation, a data portion corresponding to the read original document is generated. The CPU 12 accesses the hold job table and acquires the pointer of the hold job identified in S116. The CPU 12 reads out transmission data corresponding to the acquired pointer from the storage unit 18, and stores the transmission data in the RAM 16. The CPU 12 executes a process of adding the data portion generated due to reading this time to the transmission data stored in the RAM 16 at a position specified by the position information acquired in S130. In the above-described example, the CPU 12 adds the data portion generated due to reading this time to a position between the third page and the fourth page of the transmission data stored in the RAM 16 (including data portions for 5 pages in total, see "Job No.:2" in FIG. 3), in accordance with "Position information: 4" acquired in S130. As a result of that, the transmission data becomes new transmission data including data portions for 6 pages in total, in which the data portion generated due to reading this time is added as the fourth page.

Figure 4:
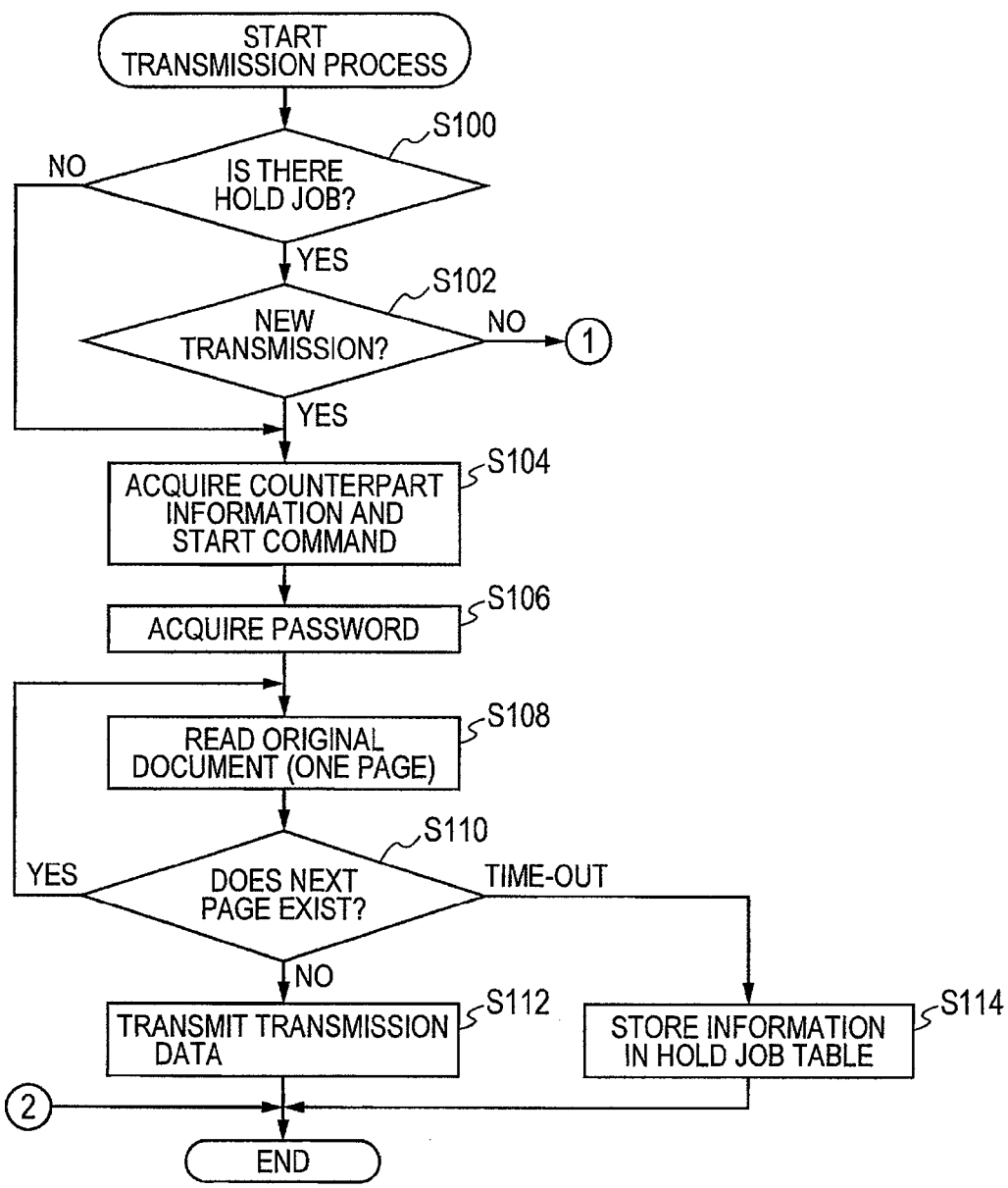
FIG. 4 is a flowchart showing a first part of a transmission process.

After the reading unit 24 completes reading, the CPU 12 controls the displaying unit 30 to display the next-page inquiring screen (see FIG. 8), in a similar manner to the processes from S108 to S110 in FIG. 4. With this control, the displaying unit 30 displays the next-page inquiring screen. After controlling the displaying unit 30 to display the next-page inquiring screen, the CPU 12 determines whether the next page exists (S136). The step S136 is a process similar to S110 in FIG. 4, and the CPU 12 executes S136 in accordance with input based on the display of the next-page inquiring screen. If the original document of the next page exists and the user places the original document of the next page on the original document table 20 and presses the "1" key of the operating unit 28 (S136: Yes), the CPU 12 returns the process to S134 and controls the reading unit 24 to again perform reading of the original document (for one page) placed on the original document table 20 (S134). The reading unit 24 performs reading of the original document placed on the original document table 20. The newly-generated data portion corresponding to the original document of the next page is added subsequent to the data portion generated by previous reading in S134. Alternatively, each time the "1" key of the operating unit 28 is pressed (S136: Yes) and the step S134 is executed again, the above-described position specifying screen (not shown) may be displayed so that position information can be acquired, and a data portion may be added to the position specified by the acquired position information.

If the user presses the "2" key of the operating unit 28 in accordance with the display of the next-page inquiring screen in a state where the original document of the next page does not exist (S136: No), the CPU 12 moves the process to S140. If the user neither presses the "1" key nor the "2" key of the operating unit 28 for the display of the next-page inquiring screen and if a preset period (time-out period) elapses after the next-page inquiring screen is displayed (S136: Time-out), the CPU 12 uses information of the hold job identified in S116 to store a new hold job corresponding to already-executed S134 in the hold job table (S138). At this time, the CPU 12 deletes the transmission data corresponding to the pointer of the hold job identified in S116, and controls to store in the storage unit 18 new transmission data to which all the data portions generated due to reading in already-executed S134 are added (that is, overwrite the transmission data). The hold job identified in S116 is overwritten with the new hold job, and the new hold job is stored in the hold job table. In this case, the new hold job is managed under the same job number as the hold job identified in S116. The setting date and time is changed to the current date and time, the pointer to the transmission data is changed to the storage-location information of the transmission data stored as described above, and the number of pages is changed to the number of pages after the data portion is added. The counterpart information and the password are the same as those of the hold job identified in S116. After executing S138, the CPU 12 ends the transmission process.

In S140, the CPU 12 controls the communicating unit 34 to transmit transmission data to the address specified by the counterpart information of the hold job identified in S116 (S140). The communicating unit 34 transmits the transmission data to the counterpart apparatus 50 corresponding to the counterpart information. If S140 is executed after it is determined as "Transmit" in S124, the transmission data to be transmitted is transmission data stored in the storage unit 18 in relation to S114 of FIG. 4. In S140, the CPU 12 reads out this transmission data from the storage unit 18 in accordance with the pointer of the hold job identified in S116, stores the transmission data in the RAM 16, and executes S140 so that the transmission data is transmitted. If S140 is executed after it is determined as "No" in S136, the transmission data to be transmitted is new transmission data stored in the RAM 16 in a state where all the data portion generated due to reading in already-executed S134 is added. The CPU 12 executes S140 so that the new transmission data stored in the RAM 16 is transmitted. After executing S140, the CPU 12 deletes the transmission data stored in the RAM 16.

Subsequently, the CPU 12 deletes the hold job identified in S116 from the hold job table to update the hold job table (S142). At the time of deleting the hold job, the CPU 12 controls to delete the transmission data corresponding to the pointer of the hold job identified in S116 from the storage unit 18. In S142, in a similar manner to S128, after deleting the hold job, reassignment of job numbers or the like may be performed. After executing S142, the CPU 12 ends the transmission process.

<Effects of the Present Embodiment>

According to the present embodiment, the following effects can be obtained.

(1) At the time of transmitting the transmission data to the counterpart apparatus 50, if an operation for an existence of the next original document is not performed (a press of the "1" key or the "2" key of the operating unit 28 in accordance with the next-page inquiring screen (see FIG. 8)) to get to a time-out state (see S110: Time-out in FIG. 4) after the user manually places an original document on the original document table 20 and the process for reading (see S108 and S110 in FIG. 4) is executed, the transmission data generated in relation to already-executed S108 is stored in the storage unit 18, and the hold job associated with respective information including the counterpart information acquired in S104 is stored in the hold job table (see FIG. 3; see S114 in FIG. 4). In the communication apparatus 10, if the "2" key of the operating unit 28 is pressed in accordance with the display of the transmission-type selecting screen (see FIG. 6; see S102: No in FIG. 4), new transmission data is generated in which a data portion corresponding to another original document is added to transmission data of the hold job stored in the hold job table (see S124: Add original document in FIG. 5; see S134), and this new transmission data is transmitted in accordance with the counterpart information of the hold job (see S140 in FIG. 5).

This can prevent a situation in which, when the "2" key of the operating unit 28 is not pressed in accordance with the next-page inquiring screen, transmission data is automatically transmitted due to an elapse of time. For example, it sometimes happens that a user manually places an original document on the original document table 20 and notices that there are not all pages of the original document while reading of the original document is executed, and then the user has to prepare the missing page of the original document. In this case, in the present embodiment, the user can add the missing original document when the missing original document is prepared, and can transmit the transmission data including a data portion corresponding to the added original document to the address specified by the inputted counterpart information. A similar process is executed in order to transmit transmission data that is managed as the hold job (see S102: No in FIG. 4; see S136: Time-out and S138 in FIG. 5). Hence, the above-described effect can also be obtained when the transmission data managed as the hold job is transmitted.

(2) According to the present embodiment, a plurality of hold jobs is stored in the hold job table, so that the plurality of hold jobs is managed by way of the hold job table (see FIG. 3). When transmission data managed as the hold job is transmitted (see S102: No in FIG. 4), the job specifying screen (see FIG. 9) is displayed on the displaying unit 30 and, in accordance with input based on this, one hold job is identified (see S116 in FIG. 5). Hence, a new data portion can be added to specific transmission data stored in the storage unit 18. Addition of a data portion can be suitably performed for a plurality of transmission data that is not transmitted yet.

(3) According to the present embodiment, when transmission data managed as the hold job is transmitted (see S102: No in FIG. 4), the position in this transmission data to add a data portion corresponding to the read original document is specified (see S130 in FIG. 5). Hence, it is possible to generate new transmission data in which a data portion corresponding to the added original document is added to an appropriate position of transmission data generated due to the prior reading, and to transmit the new transmission data.

(4) According to the present embodiment, a password is acquired (see S106 in FIG. 4), and a hold job (transmission data) (see FIG. 3) is managed in a state where the hold job is protected with the password. In addition, when transmission data managed as the hold job is transmitted, authentication is performed based on the password (see S118 and S120 in FIG. 5), and the transmission data is transmitted (see S140 in FIG. 5) on condition that the password matches (see S120: Yes in FIG. 5). Hence, it is possible to ensure security of the transmission data managed by the hold job table. A password is acquired before reading of an original document is performed (see S106 and S108 in FIG. 4). Thus, even if time-out occurs with respect to the display of the next-page inquiring screen (see S110: Time-out in FIG. 4), the password can be associated with the hold job.

<Modifications>

While the invention has been described in detail with reference to the above aspects thereof, it would be apparent to those skilled in the art that various changes and modifications may be made therein without departing from the scope of the claims.

(1) In the above-described embodiment, a case of transmitting transmission data is described. The invention can be applied to transmission in a different method from facsimile transmission. For example, the invention can be applied to transmission of transmission data via electronic mail. In this case, electronic mail to which transmission data including an additional data portion is attached is transmitted. The counterpart information in the case of electronic mail is an electronic-mail address.

(2) In the above-described embodiment, if time-out occurs in S110 of FIG. 4 and in S136 of FIG. 5 (see S110 in FIG. 4, S136: Time-out in FIG. 5), the hold job is stored in the hold job table (see S114 in FIG. 4, S138 in FIG. 5). Another option "3. Hold" may be provided in the next-page inquiring screen (see FIG. 8), so that S114 in FIGS. 4 and S138 in FIG. 5 are also executed when a hold command is acquired by a press of the "3" key of the operating unit 28. In this case, a predetermined key of the operating unit 28 may be associated with the option "3. Hold" (a dedicated key not shown in FIG. 2 may be provided). And, input of the option "3. Hold" may be performed by a press of this predetermined key, not the "3" key of the operating unit 28. When the predetermined key is pressed, the CPU 12 acquires the hold command.

(3) In the above-described embodiment, the management items of the hold job table include the counterpart information (see FIG. 3). When transmission data managed as the hold job is transmitted based on the hold job in which the counterpart information is associated with other pieces of information (see S102: No in FIG. 4), repetitive input of counterpart information is omitted. When transmission data managed as the hold job is transmitted (see S102: No in FIG. 4), too, input of counterpart information may be received, and the CPU 12 may acquire the inputted counterpart information and may control the communicating unit 34 to transmit transmission data in accordance with the newly-acquired counterpart information in S140 of FIG. 5. In this case, storing of the counterpart information in the hold job table may be omitted.

For example, if a positive determination is made in S120 of FIG. 5 (see S120: Yes in FIG. 5), input of the counterpart information may be received, and the inputted counterpart information may be acquired. Further, when it is determined as "Transmit" in S124 of FIG. 5 and the process moves to S140, input of the counterpart information may be received, and the inputted counterpart information may be acquired. In this case, in a state where it is determined as "Add original document" in S124 of FIG. 5, when the process moves from S130 to S132, input of the counterpart information may be received, and the counterpart information inputted in S132 may be acquired, in a similar manner to S104 of FIG. 4, for example. Alternatively, the user may be asked whether to input the counterpart information again, and a determination may be made in accordance with the result. If the counterpart information can be inputted again in a case where transmission data managed as the hold job is transmitted (see S102: No in FIG. 4), the transmission data can be transmitted to the address specified by the correct counterpart information, for example, even if the prior counterpart information is incorrect. Also, the transmission data can be transmitted to the address specified by different counterpart information.

What is claimed is:

1. A communication apparatus comprising:
a reader configured to read an original document placed on an original-document supporting member;
a communicator configured to transmit transmission data;
a displaying unit;
a processor; and
a memory storing instructions, the instructions, when executed by the processor, causing the processor to perform:
acquiring counterpart information corresponding to destination of the transmission data;
acquiring a re-execution command for controlling the reader to repeatedly perform reading of an original document;
acquiring a transmission command for transmitting the transmission data;
controlling the displaying unit to display a next-page inquiring screen for inquiring whether reading of an original document is to be repeated;
determining whether a preset period elapses after the next-page inquiring screen is displayed without acquisition of one of the re-execution command and the transmission command;
in response to acquisition of the transmission command, controlling the communicator to transmit the transmission data in accordance with the counterpart information;
in response to acquisition of the re-execution command, controlling the reader to repeatedly perform reading of the original document;
in response to determining that the preset period elapses, storing the transmission data in the storage unit;
acquiring an addition execution command for performing reading of an original document of a data portion that is added to the transmission data stored in the storage unit; and
in response to acquisition of the transmission command after the addition execution command is acquired, controlling the communicator to transmit new transmission data in accordance with the counterpart information, the new transmission data being acquired by adding the data portion to the transmission data stored in the storage unit, and
wherein, when executed by the processor, the instructions cause the processor to perform:
acquiring authentication information for authenticating the transmission data that is to be stored in the storage unit;
storing the transmission data in association with the authentication information;
acquiring first authentication information and storing the transmission data and the first authentication information in the storage unit in association with each other;
acquiring second authentication information prior to transmitting the new transmission data from the communicator; and
controlling the communicator to transmit the new transmission data in response to acquisition of the transmission command in a case where the addition execution command is acquired and where the second authentication information matches the first authentication information.

2. The communication apparatus according to claim 1, wherein, when executed by the processor, the instructions cause the processor to perform:

acquiring specifying information that specifies the transmission data stored in the storage unit;

storing the transmission data in association with the specifying information; and in response to acquisition of the transmission command after the addition execution command is acquired and the specifying information is acquired, controlling the communicator to transmit the new transmission data that is acquired by adding the data portion to the transmission data stored in the storage unit in association with the specifying information.

3. The communication apparatus according to claim 1, wherein, when executed by the processor, the instructions cause the processor to perform:

acquiring position information that specifies a position to add the data portion; and in response to acquisition of the transmission command after the addition execution command is acquired and the position information is acquired, controlling the communicator to transmit the new transmission data that is acquired by adding the data portion to the transmission data stored in the storage unit at the position specified by the position information.

4. The communication apparatus according to claim 1, wherein, when executed by the processor, the instructions cause the processor to perform:

acquiring the first authentication information before the reader reads the original document.

5. The communication apparatus according to claim 1, further comprising an operating unit, when executed by the processor, the instructions cause the processor to perform:

storing the transmission data in the storage unit in a case where a hold command is received through the operating unit.

6. The communication apparatus according to claim 1, wherein the reader comprises a flatbed scanner.

7. The communication apparatus according to claim 1, further comprising a displaying unit, wherein, when executed by the processor, the instructions cause the processor to perform:

determining whether the transmission data is stored in the storage unit; and in response to determination that the transmission data is stored in the storage unit, controlling the displaying unit to display a transmission-type selecting screen for selecting whether transmission this time transmits new transmission data or transmits the transmission data stored in the storage unit.

8. The communication apparatus according to claim 1, wherein the storage unit is configured to store a plurality of transmission data; and wherein, when executed by the processor, the instructions cause the processor to perform:

controlling the displaying unit to display a job specifying screen that displays the plurality of transmission data; and acquiring specifying information that specifies one of the plurality of transmission data.

9. The communication apparatus according to claim 1, further comprising a displaying unit, when executed by the processor, the instructions cause the processor to perform:

controlling the displaying unit to display a next-page inquiring screen for inquiring whether reading of an original document is to be repeated; and storing the transmission data in the storage unit in a case where a preset period elapses after the next-page inquiring screen is displayed without acquisition of one of the re-execution command and the transmission command.

* * * * *